(12) United States Patent
Stewart

(10) Patent No.: US 11,356,192 B2
(45) Date of Patent: Jun. 7, 2022

(54) PATH PROFILE ANALYSIS

(71) Applicant: BAE Systems plc, London (GB)

(72) Inventor: Craig Innes Stewart, Christchurch (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 17/441,975

(22) PCT Filed: Mar. 12, 2020

(86) PCT No.: PCT/GB2020/050622
§ 371 (c)(1),
(2) Date: Sep. 22, 2021

(87) PCT Pub. No.: WO2020/212679
PCT Pub. Date: Oct. 22, 2020

(65) Prior Publication Data
US 2022/0149978 A1    May 12, 2022

(30) Foreign Application Priority Data

Apr. 16, 2019 (EP) .................................... 19275052
Apr. 16, 2019 (GB) .................................... 1905340

(51) Int. Cl.
*H04K 3/00* (2006.01)
*H04L 67/75* (2022.01)
*H04B 17/391* (2015.01)

(52) U.S. Cl.
CPC .......... *H04K 3/68* (2013.01); *H04B 17/3912* (2015.01); *H04B 17/3913* (2015.01); *H04K 3/82* (2013.01); *H04L 67/36* (2013.01)

(58) Field of Classification Search
CPC ........ H04K 3/68; H04K 3/82; H04B 17/3912; H04B 17/3913; H04L 67/36
See application file for complete search history.

(56) References Cited

U.S. PATENT DOCUMENTS

2010/0010793 A1   1/2010   Herman
2015/0054826 A1   2/2015   Varga

FOREIGN PATENT DOCUMENTS

| EP | 3185623 A1 | 6/2017 |
|---|---|---|
| GB | 2542491 A | 3/2017 |
| GB | 2542907 A | 4/2017 |
| WO | 2017025742 A1 | 2/2017 |

OTHER PUBLICATIONS

European Search Report for Patent Appl. No. 19275052.9-1218 dated Oct. 16, 2019, 6 pages.
GB Search Report for Patent Appl. No. GB1905340.4 dated Oct. 8, 2019, 3 Pages.
International Search Report for PCT/GB2020/050622 dated May 11, 2020, 10 Pages.
International Preliminary Report on Patentablity dated Oct. 28, 2021, 7 Pages.

*Primary Examiner* — Natasha W Cosme
(74) *Attorney, Agent, or Firm* — Maine Cernota & Rardin

(57) ABSTRACT

The present invention provides an emissions control apparatus for an entity. The emissions control apparatus comprises: storage means for storing transmission data relating to an entity; a controller configured to calculate a propagation profile for the entity based on at least the transmission data; and a display for displaying the propagation profile. The present invention also provides a method of controlling emissions.

19 Claims, 6 Drawing Sheets

PATH PROFILE ANALYSIS

RELATED APPLICATIONS

This application is a national phase application filed under 35 USC § 371 of PCT Application No. PCT/GB2020/050622 with an International filing date of Mar. 12, 2020, which claims priority of GB Patent Application 1905340.4 filed on Apr. 16, 2019, and EP Patent Application 19275052.9 filed on Apr. 16, 2019. Each of these applications is herein incorporated by reference in its entirety for all purposes.

FIELD OF THE INVENTION

The present invention relates to an emission control apparatus and a method of controlling emissions, particularly but not exclusively electromagnetic emissions generated by a vehicle.

BACKGROUND

Electronic Warfare (EW) systems are known. These provide the ability to deny adversary assets the ability to communicate effectively with each other or to generate a firing solution or missile lock. EW systems also provide an asset with the ability to detect the location of adversary assets such that they can be avoided or targeted. The EW system could, for example, include a radar warning receiver on an aircraft, and here the adversary asset is an inbound missile. The radar warning receiver provides the pilot of the aircraft with an indication of the bearing the missile is on relative to the aircraft, but does not warn the pilot of the radar signature that the aircraft is presenting to the missile or inform them of an action that could be performed to minimise the chance of the aircraft being detected in the first place.

Turning all transmitters off completely when it is known that an adversarial detector is in the area is one option used to reduce the likelihood of detection. However, it would be advantageous to minimise the time for which a transmitter is switched off, and provide users with the ability to determine the risk of detection. Further, it would be advantageous to plan a route for the transmitting asset that reduces the likelihood of detection.

SUMMARY

According to a first aspect of the present invention, there is provided an emissions control apparatus for an entity, the emissions control apparatus comprising:
  storage means for storing transmission data relating to the entity;
  a controller configured to calculate a propagation profile for the entity based on at least the transmission data; and
  a display for displaying the propagation profile.

Advantageously, by allowing a user to see the propagation profile for themselves or a vehicle that they are operating, they are better prepared to make decisions in a hostile environment. For example, the user is able to decide whether it is preferable to move the vehicle, reduce the power to an electromagnetic transmitter, or change the direction in which an antenna is pointing.

The transmission data may include at least one of signal frequency, signal power, antenna gain, antenna power, antenna type and antenna pointing direction. Transmission data may not be restricted to that associated with a particular communications standard or electromagnetic signal, but may for example relate to the audible transmission generated by an engine in operation. The entity may be a human, building or vehicle. More specifically, the entity may comprise a wheeled or tracked vehicle having one or more electromagnetic transmitters.

The storage means may be further arranged to store entity location data and environment data, and the controller may be configured to calculate the propagation profile for the entity based on the transmission data, environment data and entity location data.

The environment data may include at least one of meteorological data and terrain data.

The storage means may further store adversary data, wherein the adversary data comprises adversary location data and at least one of adversary antenna gain, adversary antenna power, and adversary type. The adversary type may be, for example, a person, an acoustic array, a radar, or an electromagnetic energy detector.

The controller may be further configured to:
  calculate an adversary detection profile for an adversary based on the adversary data and optionally the environment data; and
  display the adversary detection profile, the location of the adversary and the propagation profile on the display.

The emissions control apparatus may comprise a decision engine configured to:
  if the propagation profile overlaps the adversary detection profile, suggest or perform at least one mitigation action to reduce the probability of detection of the entity.

The decision engine may be configured to:
  calculate a new propagation profile based on adjusted entity characteristics, the transmission data, and the environment data, wherein the new propagation profile does not overlap the adversary detection profile; and
  display the values of the adjusted entity characteristics on the display such that the user is able to adjust the entity characteristics to match the adjusted entity characteristics; or
  generate a control signal to adjust the entity characteristics to match the adjusted entity characteristics.

The entity characteristics may include at least one of velocity, bearing, location, engine speed, antenna transmission power, antenna transmission frequency and antenna pointing direction.

The storage means may store a preferred route for the entity, and the at least one mitigation action may be selected to minimise deviation from the preferred route. Alternatively, the at least one mitigation action may comprise diverting the entity from a preferred route.

The emissions control apparatus may further comprise a wireless receiver arranged to receive the environment data and/or the adversary data from another entity for storage in the storage means.

The emissions control apparatus may comprise a user input for allowing a user to input location data, wherein the controller may be configured to:
  calculate a first propagation profile for the entity based at least on the transmission data;
  display the first propagation profile on the display;
  receive the user-input location data;
  calculate a second propagation profile based on the user-input entity location data and the transmission data; and
  display the second propagation profile on the display.

According to a second aspect of the present invention, there is provided a vehicle having one or more transmitters and an emissions control apparatus according to the first aspect.

According to a third aspect of the present invention, there is provided a method of controlling emissions, the method comprising:

storing transmission data relating to an entity;
calculating a propagation profile for the entity based on at least the transmission data; and
displaying the propagation profile.

The transmission data may include at least one of signal frequency, signal power, antenna gain, antenna power, antenna type and antenna pointing direction.

The method may further comprise:

calculating an adversary detection profile for an adversary based on adversary data and optionally the environment data; and
displaying the adversary detection profile, the location of the adversary and the propagation profile,
wherein the adversary data comprises adversary location data and at least one of adversary antenna gain, adversary antenna power, and adversary type.

The method may comprise:

if the propagation profile overlaps the adversary detection profile, suggesting or performing at least one mitigation action to reduce the probability of detection of the entity.

The method may comprise:

calculating a new propagation profile based on adjusted entity characteristics, the transmission data, and the environment data, wherein the new propagation profile does not overlap the adversary detection profile; and
displaying the values of the adjusted entity characteristics on the display; or
generating a control signal to adjust the entity characteristics to match the adjusted entity characteristics.

The entity characteristics may include at least one of velocity, bearing, location, engine speed, antenna transmission power, antenna transmission frequency and antenna pointing direction.

The at least one mitigation action may be selected to minimise deviation from a preferred route for the entity. Alternatively, the at least one mitigation action may comprise diverting the entity from a preferred route.

The method may comprise:

calculating a first propagation profile for the entity based at least on the transmission data and optionally the environment data;
displaying the first propagation profile on the display;
receiving user-input location data;
calculating a second propagation profile based on the user-input entity location data and the transmission data and optionally the environment data; and
displaying the second propagation profile on the display.

It will be appreciated that features described in relation to one aspect of the present invention can be incorporated into other aspects of the present invention. For example, an apparatus of the invention can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the invention will now be described by way of example only and with reference to the accompanying drawings.

For convenience and economy, the same reference numerals are used in different figures to label identical or similar elements.

DETAILED DESCRIPTION

Generally, embodiments herein relate to an emissions controller for presenting an entity's transmission propagation profile to a user to assist the user in making decisions such as defining a path for the entity to follow. The emissions controller may also calculate the detection profiles of adversary assets and determine the likelihood of the entity being detected. The emissions controller may further be configured to mitigate, or provide information to a user to allow them to mitigate, the threat of detection.

Figure 1:
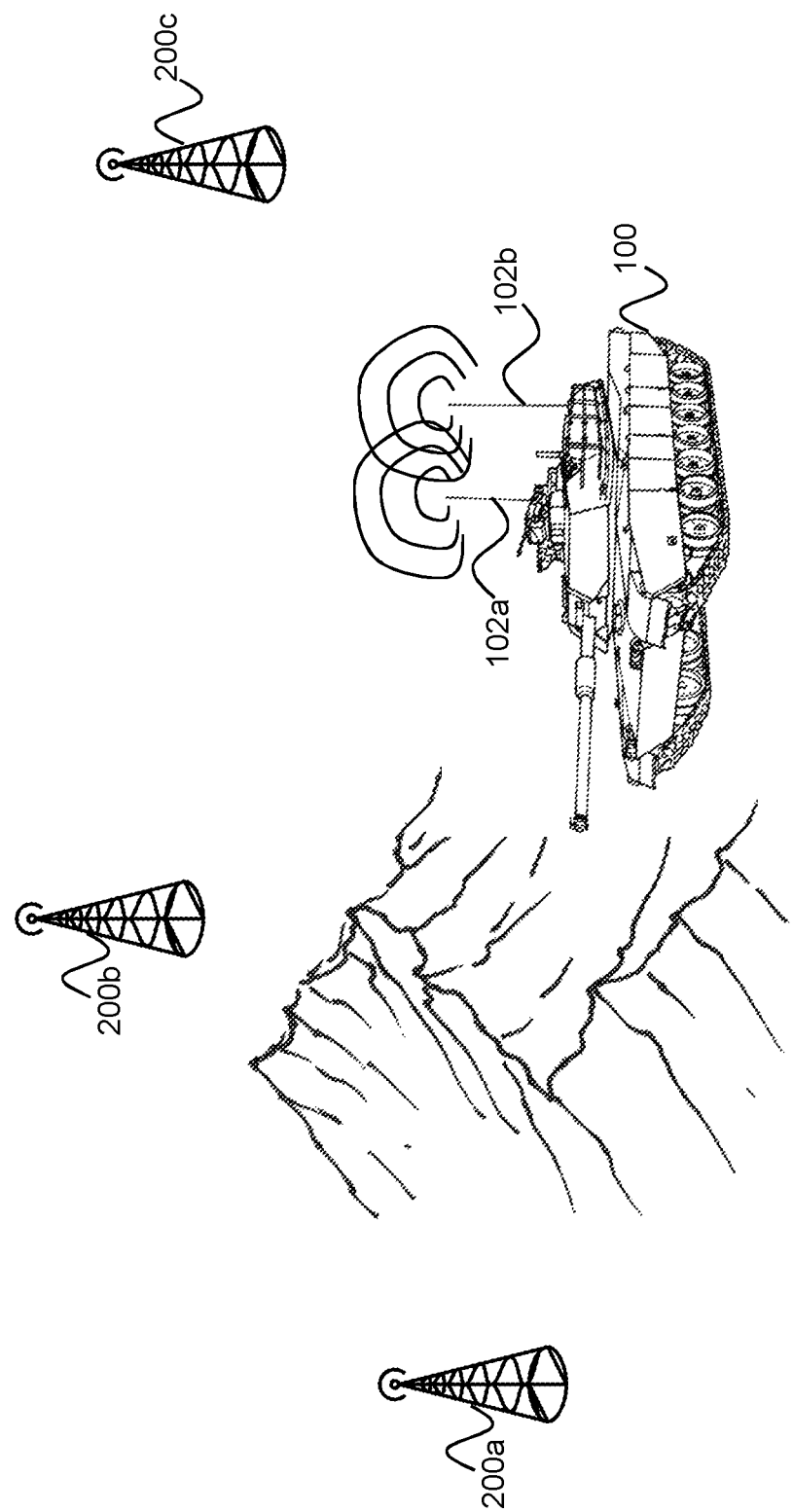
FIG. 1 is a schematic of an environment in which the present invention would operate.

To provide context, a typical operating environment of a vehicle 100 having the emissions controller is shown in FIG. 1. While the vehicle 100 is depicted as being a tank, it would be appreciated that the emissions controller could be incorporated into other types of vehicle, such as a communications vehicle, surface-to-air missile launcher, troop transport, aircraft or naval vessel (including ships and submarines). Instead of a vehicle 100, the emissions controller may also be applied to other forms of entities, such as dismounted soldiers or buildings.

The vehicle 100 may be operated remotely, for example an unmanned aircraft. Here, the emissions controller is provided in a ground station in which the vehicle operator is situated.

The vehicle 100 includes a plurality of transmitters 102a, 102b (generally 102). The transmitters 102 radiate electromagnetic energy in a predictable propagation profile. The transmitters 102 may be for communication with other assets in the network (e.g. the vehicle 100 may operate as a relay) or may be used to detect adversaries. Here, one transmitter 102a, for example, may be a VHF transmitter while another transmitter 102b may be a UHF transmitter. Other types of transmitters 102 include WiFi and LTE. Each transmitter 102 may be associated with a single antenna, or a plurality of antennas operating in a multiple in multiple out (MIMO) configuration. In the detection mode, the transmitters 102 may be radar emitters. Here, signals are emitted and bounce off terrain and adversary assets. The reflected signals are used to generate a picture of the environment. In other embodiments, such as in naval environments, the transmitters 102 may be sonar arrays.

A number of adversary assets 200a, 200b, 200c (generally 200) are present within the environment. Each of the adversary assets 200 is equipped for detecting the vehicle 100. In this example, the adversary assets 200 are fixed eavesdropping facilities designed to detect electromagnetic signal transmission. They comprise passive but highly sensitive antenna systems for triangulating or obtaining a bearing to a transmitting entity. The adversary assets 200 may also or alternatively be equipped with sonar (for example, to detect underwater vehicles), LiDAR or radar. The adversary assets 200 may be humans capable of seeing or hearing the vehicle 100 when it is within a particular range. The adversary assets 200 may be mobile, such as loitering aircraft, communications vehicles, surface-to-air missile batteries, etc.

The location and capability of the adversary assets 200 may be determined by Information, Surveillance and Reconnaissance (ISR) assets or Information, Surveillance, Target Acquisition and Reconnaissance (ISTAR) assets such as Special Forces, satellites, Electronic Intelligence (ELINT) aircraft or Signals Intelligence (SIGINT) aircraft. This adversary asset information is transmitted to the vehicle 100 having the emissions controller or a ground station for controlling the vehicle 100. Alternatively, the vehicle 100 itself may be equipped to determine the location and capability of adversary assets 200 without external input.

Figure 2:
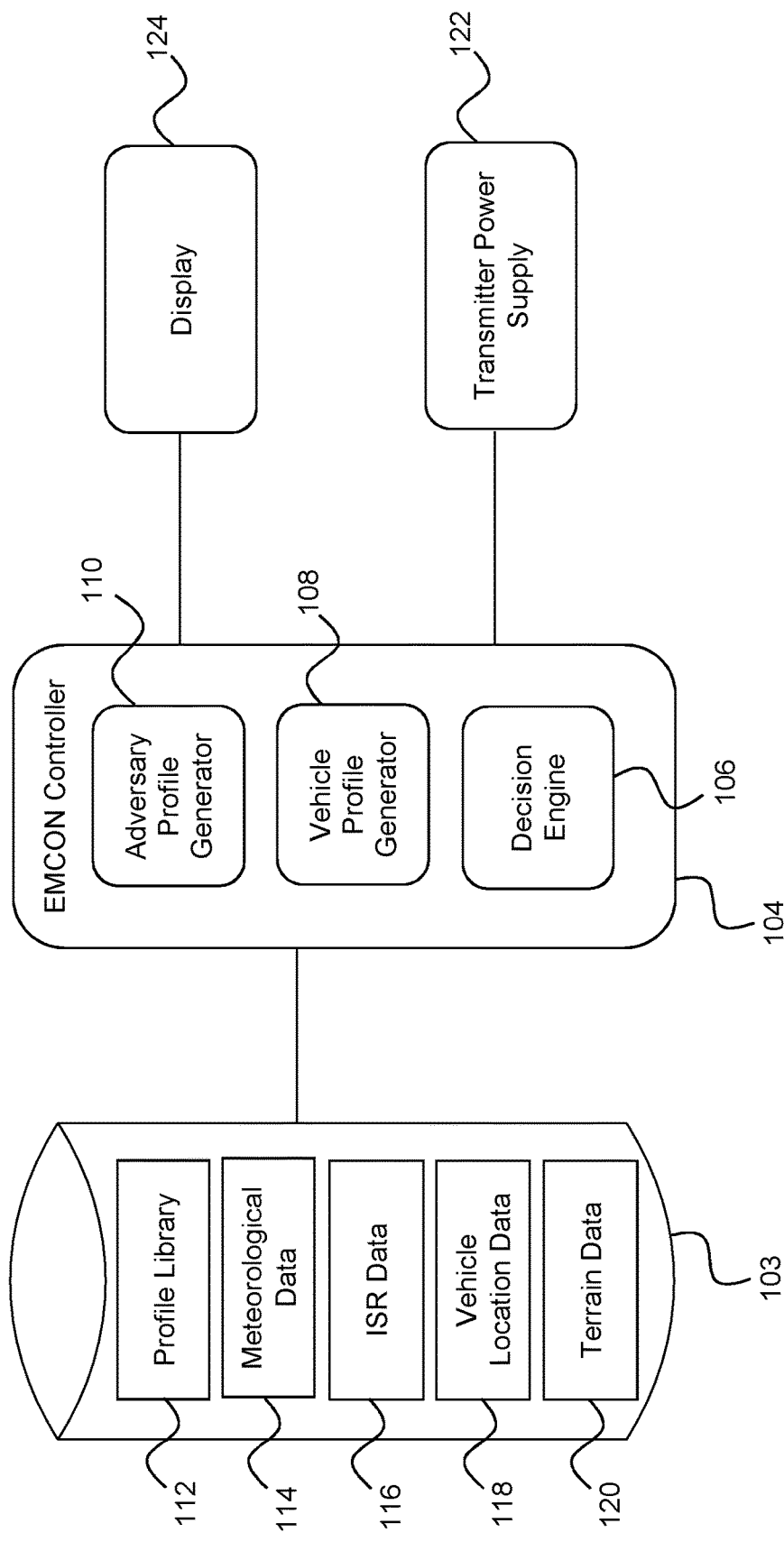
FIG. 2 is a system diagram of a propagation analysis apparatus according to embodiments of the present invention.

The emissions controller 104 will now be described in more detail with reference to FIG. 2. The emissions controller 104 may otherwise be known as an emissions control (EMCON) controller. The emissions controller 104 may take any suitable form. For instance, it may be a microcontroller, plural microcontrollers, a processor, or plural processors.

The emissions controller 104 is coupled to a database 103. The database 103 comprises a plurality of data, including a profile library 112, meteorological data 114, ISR data 116, vehicle location data 118 and terrain data 120. While a single database 103 is depicted, it would be appreciated that the various data sources may be distributed among a plurality of independent databases. The database 103 may be stored onboard the vehicle 100. Alternatively, the emissions controller 104 may receive the data over the air from databases in other assets. In other words, the data may be prestored on the vehicle 100 prior to the vehicle's deployment, or received during operation of the vehicle 100. Data may also be manually entered by users of the emissions controller 104 during operation; for example, the vehicle location data 118 may be a grid reference entered by the user to allow them to determine what the propagation profile will be at that location.

ISR data 116 is the data regarding the location and capability of adversary assets 200, as explained above. It may be stored in the database 103 prior to deployment, or received in real-time via a communications link such as a Tactical Datalink (TDL). In addition to location and type of adversary assets 200, the ISR data 116 includes the idealised detection profiles of the adversary assets 200. These idealised detection profiles can be modified once terrain and meteorological data is known for the vicinity of the adversary asset 200.

In an embodiment, the profile library 112, contains an idealised signal propagation profile for a particular antenna at different frequencies of operation. In other words, the database 103 contains information regarding the shape and extent of electromagnetic signal propagation at different power input levels without attenuation due to terrain or meteorological. For example, the shape of an idealised propagation profile for an omnidirectional antenna will be substantially spherical, with the diameter of the sphere being dictated by the power input into the antenna. This idealised signal propagation profile at a particular power input may be useful for a vehicle operator to view graphically, regardless of other factors, as the other data inputs may not be available in particular environments such as where friendly assets have ceased communicating. The profile library 112 includes a lookup table of antenna type correlated with idealised signal propagation profile. Therefore, the system can be configured to suit the configuration of the vehicle 100, if the vehicle 100 is modified to include different types of antennas.

In other embodiments, the profile library 112 alternatively or additionally includes other vehicle parameters, such as engine volume and/or frequency at a particular RPM. While embodiments of the present invention are primarily related to minimising the electronic footprint of the vehicle 100, where necessary, it would be appreciated that the same concept could be applied to physical characteristics of the vehicle 100 such as its volume or silhouette.

The meteorological data 114 includes the current and/or future meteorological prediction for the location of the vehicle 100 indicated by the vehicle location data 118. Meteorological data 114 includes precipitation type and volume, air pressure, temperature and humidity. The meteorological data 114 may also include a factor indicating a likelihood of future meteorological patterns.

Vehicle location data 118 provides the current or selected location of the vehicle 100. It may include a predetermined route for the vehicle 100. The vehicle location data 118 may include coordinates, such as latitude and longitude or grid references. The vehicle location data 118 may be received from positioning systems onboard the vehicle 100, such as a Global Positioning System (GPS).

Terrain data 120 may be mapping data received from satellites, ground surveys or high altitude aircraft. The terrain data 120 indicates the type and elevation of terrain. The terrain data 120 may include the material from which the terrain is made; for example, a hill region formed of predominantly of limestone may attenuate signals differently to a hill region formed predominantly of granite. In the example shown in FIG. 1, one adversary asset 200a is located behind a mountain (behind being relative to the vehicle 100, which is in front of the mountain). Therefore, the detection capability of the adversary asset 200a is reduced in the direction of the vehicle 100 relative to the detection capability of equidistant adversary assets that do not have vertical terrain features between them and the vehicle 100.

The emissions controller 104 is coupled to a display device 124 and, in the illustrated embodiment at least, a transmitter power supply 122. The transmitter power supply 122 is used to power the transmitter(s) 102. Increasing the power to a transmitter 102 increases its range; while reducing the power, or turning the transmitter off, reduces the probability of the vehicle 100 being detected. In other embodiments, the emissions controller 104 is coupled to another vehicle 100 control module instead of or in addition to the transmitter power supply 122. For example, the emissions controller 104 may be coupled to a mechanism for driving the direction in which an antenna is pointing (e.g. where the antenna is a directional antenna), or coupled to the vehicle's gearbox or engine circuitry.

The emissions controller 104 includes a decision engine 106, a vehicle profile generator 108 and an adversary profile generator 110. The decision engine 106, vehicle profile generator 108 and adversary profile generator 110 may be separate hardware elements. Alternatively, they may be independent software modules which are either standalone or part of a single programme.

The vehicle profile generator 108 modifies the idealised propagation profile stored in the profile library based on the meteorological data 114 and terrain data 120. The meteorological data 114 and terrain data 120 is chosen based on the vehicle location data 118. The modified propagation profile is then transmitted to the display device 124 for display to a user.

Similarly to the vehicle profile generator 108, the adversary profile generator 110 generates a detection profile for an adversary 200 (or a plurality of adversaries) based the information known about the adversary 200 contained in the ISR data 116, the meteorological data 114 and the terrain data 120. The detection profile is also transmitted to the display apparatus 124 to be overlaid on the asset propagation profile. Alternatively, the emissions controller 104 may overlay or integrate the asset propagation profile and adversary detection profile prior to transmission to the display apparatus 124.

The decision engine 106 uses the interaction (for example, the extent or predicted future extent of overlap) between the asset propagation profile and the adversary detection profile to determine actions that could be performed to minimise the likelihood of the vehicle 100 being detected while increasing the operational effectiveness of the vehicle 100, for example by maximising communications range. The determined actions may minimise the vehicle's EM or audible signature, or move the vehicle 100 into positions where the adversary assets 200 are less likely to detect the noise or EM emissions from the vehicle 100.

The emissions controller 104 may generate control signals to automatically perform the actions suggested by the decision engine 106. For example, the emissions controller 104 may generate a control signal to control the transmitter power supply 122 to reduce power delivered to the transmitter 102. Here, the decision engine 106 may implement a cost function to determine the best action to perform for the presented situation. Alternatively, the emissions controller 104 may transmit the decision engine's suggestions to the display apparatus 124 for the user to implement. The decision engine 106 may generate a number of selectable alternative actions, presented in a particular order. For example, the actions may be listed in a priority order, where the top action minimises change to the vehicle's route.

Examples of actions generated by the decision engine 106 to adapt the vehicle's characteristics to reduce the likelihood of detection may include one or combinations of: moving the vehicle 100, changing the vehicle's route (i.e. diverting the vehicle 100), adapting the shape of the vehicle, changing the vehicle's speed, changing gear, turning one or a number of transmitters 102 off, increasing or decreasing power to a transmitter 102, changing transmission frequency, and changing the pointing direction of an antenna.

While a wired display device 124 is illustrated, it would be appreciated that the display device 124 in other embodiments is a wireless device that receives the propagation profile from the emissions controller 104 over the air. The display device 124 comprises a controller, touch sensitive display, hardware keys, a memory and an interface. The controller is connected to each of the other components in order to control operation thereof. The touch sensitive display is optional, and as an alternative a display with non-touch sensitive input may be used with the hardware keys and/or a mouse peripheral.

The controller, in some embodiments, is the emissions controller 104. In other words, in some embodiments, the emissions controller 104 and display device 124 are embodied in the same device. Here, the device accesses the database 103 through a wired or wireless connection, or receives the data over the air. In some embodiments, the emissions controller 104, database 103 and display device 124 are contained within the same device. For example, a standalone tablet computer or mobile phone may comprise the emissions controller 104, database 103 and display device 124.

The information generated by the emissions controller 104, as displayed on the display device 124, will now be described with reference to FIGS. 3, 4a and 4b. In these Figures, the position of the vehicle 100 is indicated by a cross on the display of the display device 124.

Figure 3:
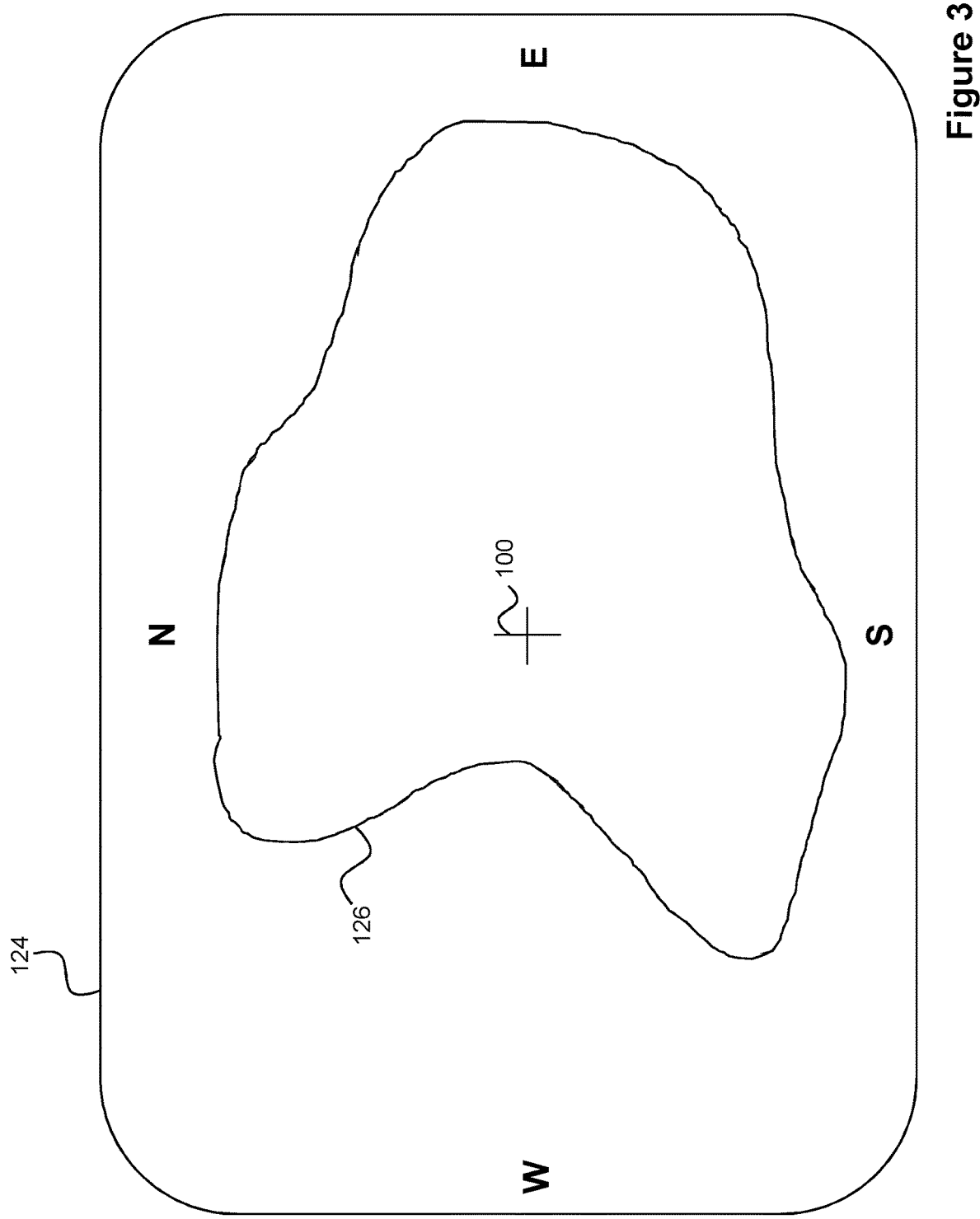
FIG. 3 is shows a propagation profile according to an embodiment of the present invention.

In FIG. 3, the vehicle profile generator 108 has generated a propagation profile 126 for the vehicle 100 based on the terrain data 120, meteorological data 114 and profile library 112. The propagation profile 126 demonstrates the maximum distance from the vehicle 100 that the vehicle 100 can be detected, in any direction. In this illustrated embodiment, the propagation profile 126 is an EM propagation profile for one of the transmitters 102a, 102b, where each transmitter 102a, 102b operates on a different frequency. In this embodiment, the user is able to select the transmitter 102 that they wish to view the propagation profile 126 for. For example, the transmitter 102a operating on a lower frequency (longer wavelength) may be detectable at a greater ranger than the transmitter 102b operating on a higher frequency (shorter wavelength). In another embodiment, the propagation profile 126 is a combined (integrated) propagation profile 126 for all transmitters 102 on the vehicle 100 and indicates the absolute maximum range of detection regardless of frequency. In another embodiment again, propagation profiles 126 for different transmitters 102 may be overlaid on top of each other on the display. In an alternative embodiment, the propagation profile 126 represents sound wave propagation.

While the propagation profile 126 illustrated here is a uniform distribution with a sharp cut-off, in other embodiments the propagation profile 126 may be represented as a heat map of probabilities of detection. For example, signal strength, and consequently likelihood of detection, is highest at the vehicle 100 itself. Toward the outer edge of the propagation profile 126, signal strength might so low as to be undetectable by all but the most sensitive of radio receivers. Therefore, the propagation profile 126 may be divided into bands to indicate the probability of a signal being detectable at a particular range. Instead of probability of detection, the heat map may indicate signal strength, from which the user can infer likelihood of detection.

To demonstrate the effect of terrain on signal propagation, the propagation profile 126 is limited in the westerly direction. This is due to the mountain range shown in FIG. 1 to the west of the vehicle 100, and EM signals at the frequency of the selected transmitter 102 not being able to pass through or over the terrain. The user may not have been aware of the extent of the vehicle's EM profile without viewing the propagation profile 126 on the display device 124, and so might have needlessly turned the vehicle's transmitters 102 off when informed of enemies to the west of the mountain range.

Figure 4A:
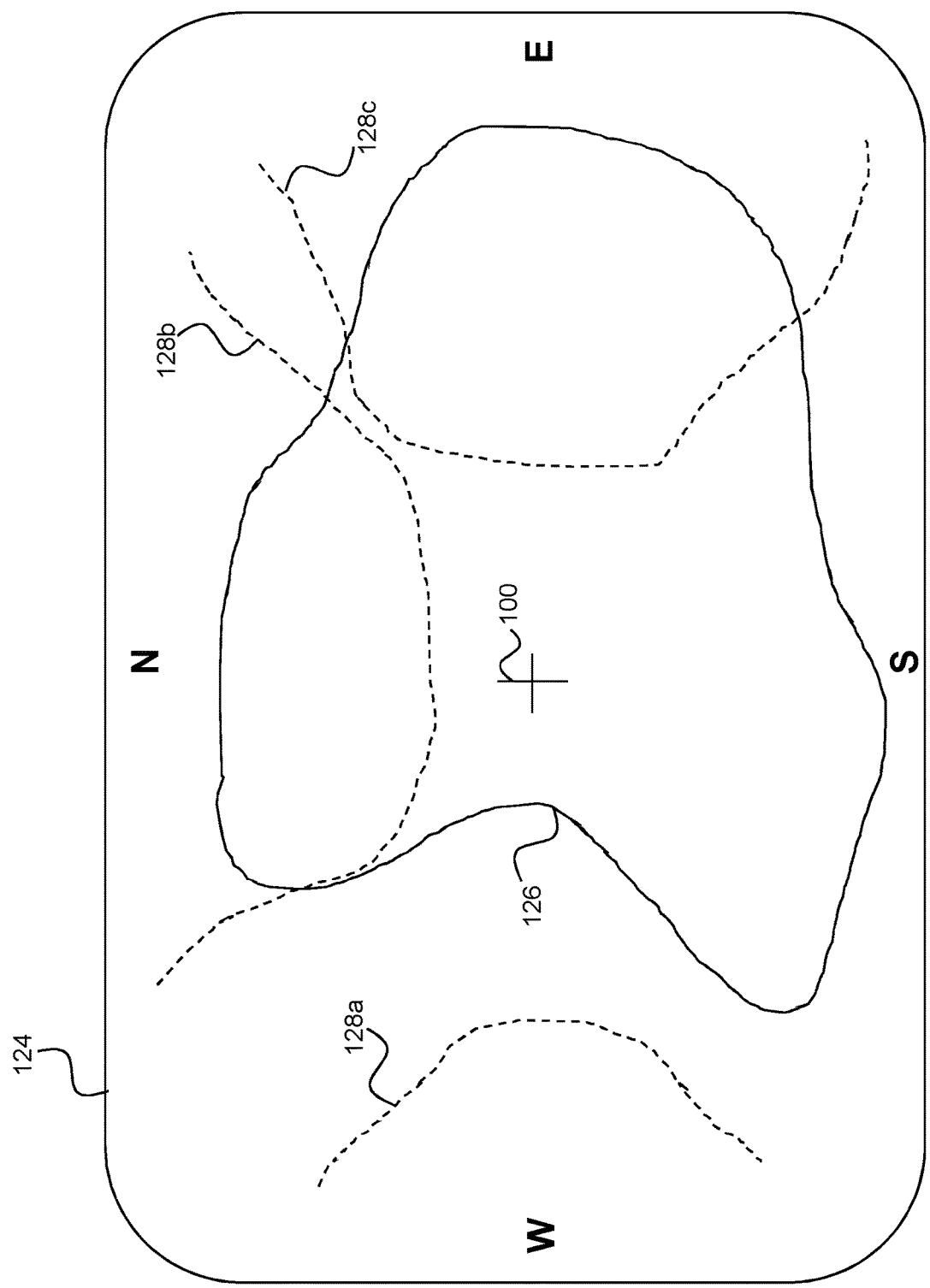
FIGS. 4a and 4b show propagation profiles and sensitivity profiles according to another embodiment of the present invention.
Figure 4B:
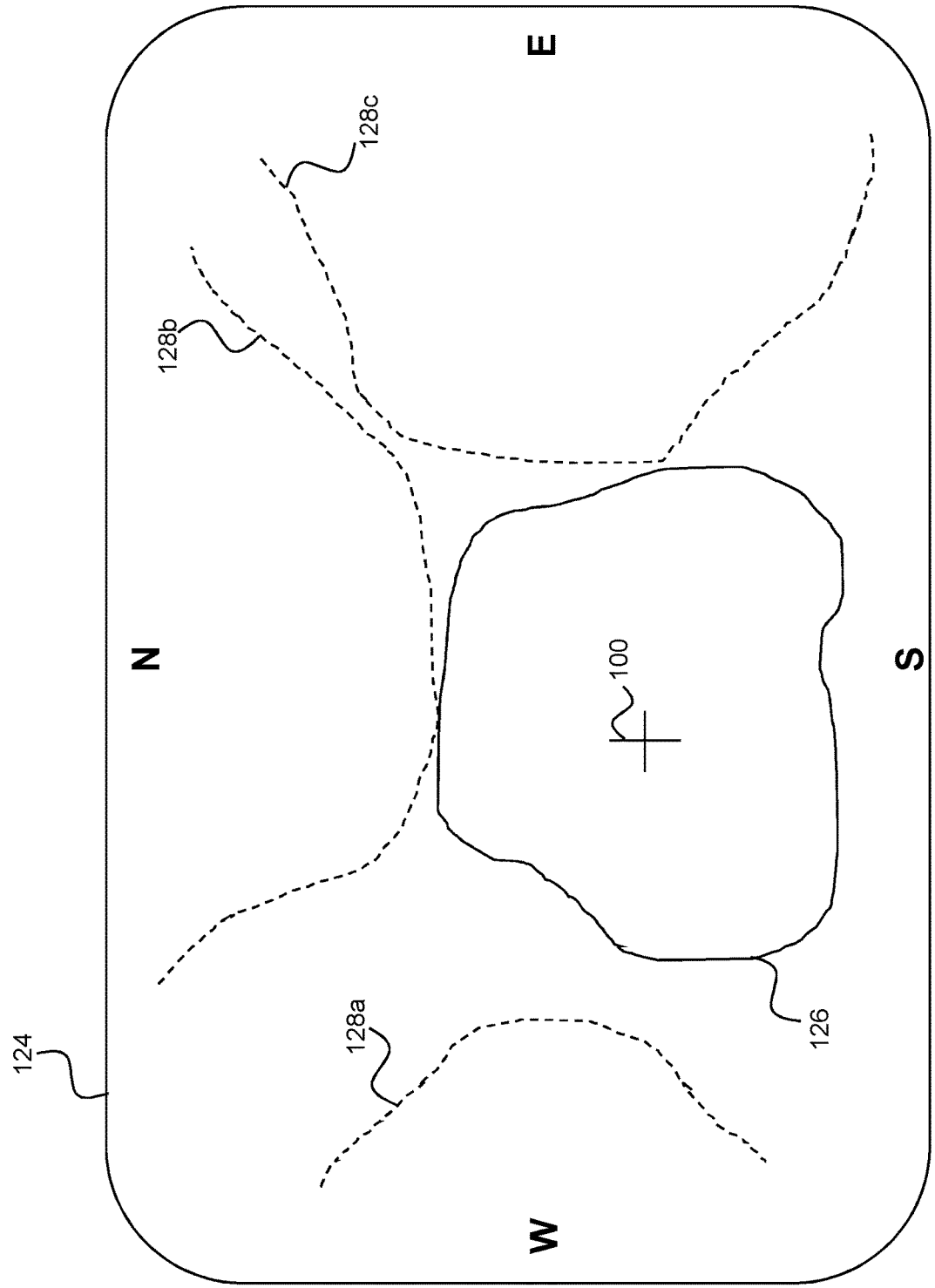

The displayed information in FIG. 4a demonstrates that the vehicle 100 is likely to be detected by two of the adversary assets 200b, 200c. The propagation profile 126 is intersected by (or overlapped by) detection profiles 128b, 128c of the adversary assets 200b, 200c. One of the detection profiles 128a does not intersect with the propagation profile 126, and therefore it is unlikely that the vehicle 100 will be detected by the adversary asset 200a associated with this detection profile 128a.

The position of the vehicle 100 on the display of the display device 124, relative to terrain features and/or adversary assets 200, may be the actual real-time position of the vehicle 100, based on the location data 118. Alternatively, the position of the vehicle 100 on the display of the display device 124 may be an intended future position of the vehicle 100, based on a pre-stored route.

In some embodiments, the decision engine 106 generates suggested actions for the user to perform to minimise the current or future likelihood of detection of the vehicle 100 by the adversary assets 200. In other words, the decision engine 106 suggests actions that adapt the vehicle 100 to reduce or eliminate overlap of the propagation profile 126 and detection profiles 128. One or more of these suggested actions may be automatically performed, or a description of the action may be presented on the display of the display device 124.

In the illustrated embodiment, the display device 124 comprises a touchscreen. The user is able to drag the artificial position of the vehicle 100 on the display to a new position. FIG. 4b shows this new position, slightly southwest of the original position in FIG. 4a. Due to the change of terrain in the vicinity of the new position, the propagation profile 126 is modified. Also, in this case the user has chosen to reduce power to the transmitters 102, and therefore the overall extent of the propagation profile 126 is reduced.

Instead of a touchscreen, in another embodiment the user is able to move the artificial position of the vehicle 100 on the display using a mouse, keyboard or electronic pen peripheral device in order to plan movements of the vehicle 100 to adjust the propagation profile 126.

In another embodiment, the user may not be able to move the vehicle 100 away from a predetermined route (i.e. the user may not be able to divert the vehicle 100), or adjust the position of the vehicle 100 on the display at all. Here, the displayed propagation profile 126 is modified when the user adjusts, or simulates an adjustment of, other vehicle 100 characteristics such as antenna pointing direction or transmission power.

Figure 5:
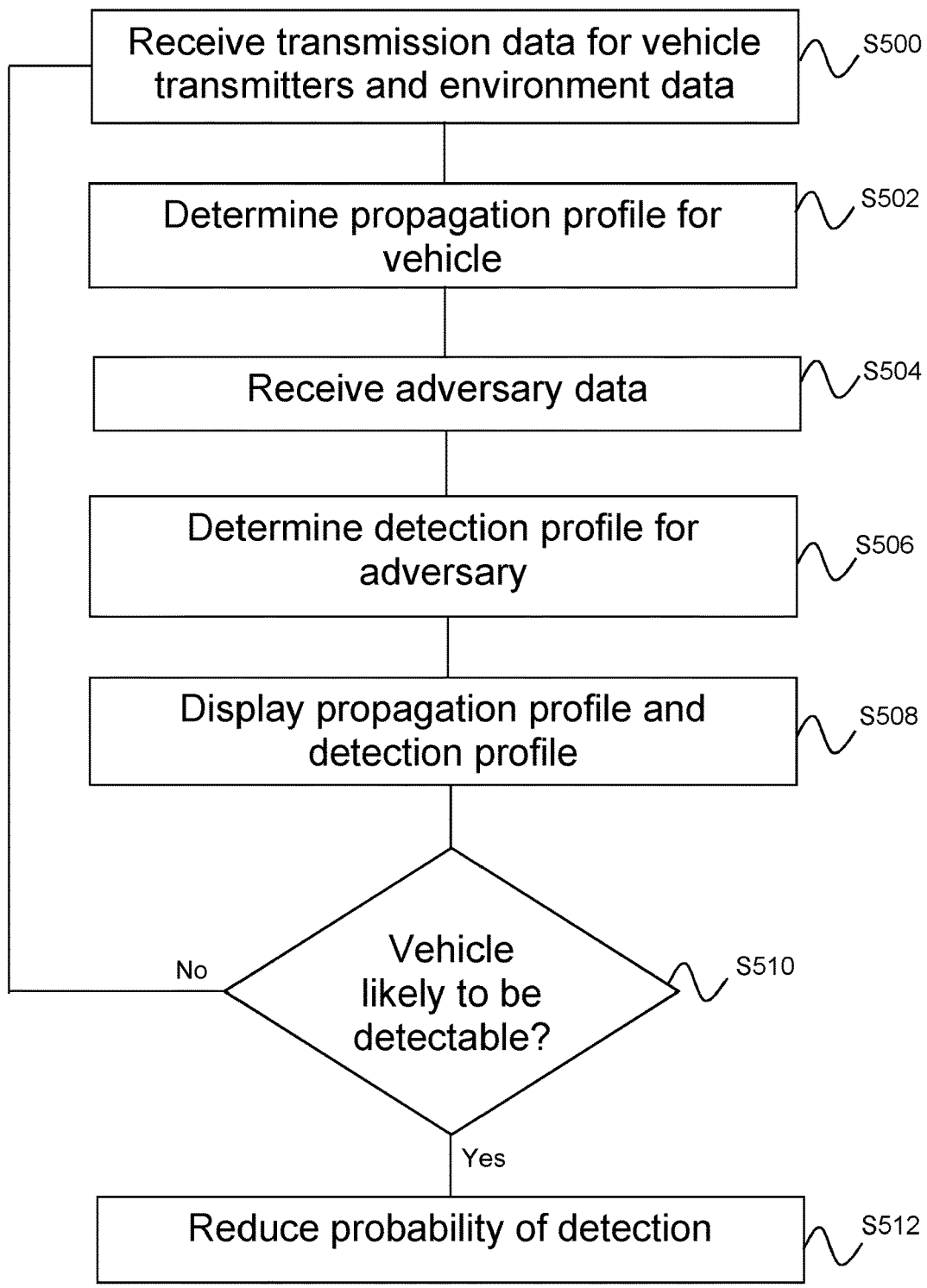
FIG. 5 is a flowchart showing a method of analysing signals according to embodiments of the present invention.

FIG. 5 shows a method of controlling emissions according to an embodiment. In a first step S500, transmission and environment data is received by the emissions controller 104 from a database 103, or other from another asset using a wireless transmission, for the specific transmitters 102 onboard the vehicle 100. Environment data includes terrain data 120 and meteorological data 114, for example. Transmission data includes details of the transmitter 102 or other physical characteristics of the vehicle 100, as contained in the profile library 112 or otherwise measured in real-time.

In a second step S502, the vehicle profile generator 108 uses the transmission and environment data to generate a propagation profile 126.

In step S504, information about adversary assets 200, such as type, maximum detection range, position, speed and direction of travel is received by the emissions controller 104 from the database 103, or other asset using a wireless transmission. In step S506, the adversary profile generator 110 uses the information about the adversary assets 200, and the environment data received in step S500, to generate adversary detection profiles 128 for the adversary assets 200.

In step S508, the generated propagation profile 126 and adversary detection profile 128 are sent to the display device 124 for display to the user. In some embodiments, the user is able to manipulate the position or other characteristics of the vehicle 100 on the display in order to simulate a new propagation profile. Here, the vehicle profile generator 108 receives the selected position or other modified characteristic (such as transmission power, antenna pointing direction, or vehicle speed) and generates a new propagation profile for display.

In the illustrated embodiment, in step S510 the decision engine 106 determines if the vehicle 100 is likely to be detected by the adversary assets 200, based on the propagation profile 126 and adversary detection profiles 128. If it is determined that the vehicle 100 is likely to be detected, due to an overlap of the propagation profile 126 and adversary detection profiles 128, in step S512 the decision engine 106 may suggest actions to perform to reduce the likelihood of detection or automatically perform one or more actions to reduce the likelihood of detection. Alternatively, the decision engine 106 may generate a warning to warn the user that the vehicle 100 is likely to be detectable in its current configuration or mode of operation.

In an alternative embodiment, steps S510 and S512 are performed as an alternative to step S508 rather than in addition thereto. In other words, the identification of an increased chance of detection and performance of a mitigation action may occur entirely without the user being made aware. This is particularly useful where the vehicle 100 is autonomous and has no user.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

What is claimed is:

1. An emissions control apparatus for an entity, the emissions control apparatus comprising:
    storage means for storing transmission data relating to the entity;
    a controller configured to calculate a propagation profile for the entity based on at least the transmission data; and
    a display for displaying the propagation profile wherein the storage means further stores adversary data, wherein the adversary data comprises adversary location data and at least one of adversary antenna gain, adversary antenna power, and adversary type.

2. The emissions control apparatus according to claim 1, wherein the transmission data includes at least one of signal frequency, signal power, antenna gain, antenna power, antenna type and antenna pointing direction.

3. The emissions control apparatus according to claim 1, wherein the storage means is further arranged to store entity location data and environment data, and wherein the controller is configured to calculate the propagation profile for the entity based on the transmission data, environment data and entity location data.

4. The emissions control apparatus according to claim 3, wherein the environment data includes at least one of meteorological data and terrain data.

5. The emissions control apparatus according to claim 1, wherein the controller is further configured to:
   calculate an adversary detection profile for an adversary based on the adversary data and optionally on environment data; and
   display the adversary detection profile, the location of the adversary and the propagation profile on the display.

6. The emissions control apparatus according to claim 5, comprising a decision engine configured to:
   if the propagation profile overlaps the adversary detection profile, suggest or perform at least one mitigation action to reduce the probability of detection of the entity.

7. The emissions control apparatus according to claim 6, wherein the decision engine is configured to:
   calculate a new propagation profile based on adjusted entity characteristics, the transmission data, and the environment data, wherein the new propagation profile does not overlap the adversary detection profile; and
   display the values of the adjusted entity characteristics on the display such that the user is able to adjust the entity characteristics to match the adjusted entity characteristics; or
   generate a control signal to adjust the entity characteristics to match the adjusted entity characteristics.

8. The emissions control apparatus according to claim 6, wherein the storage means stores a preferred route for the entity, and wherein the at least one mitigation action is selected to minimise deviation from the preferred route.

9. The emissions control apparatus according to claim 5, further comprising a wireless receiver arranged to receive the environment data and/or the adversary data from another entity for storage in the storage means.

10. The emissions control apparatus according to claim 1, comprising a user input for allowing a user to input location data, wherein the controller is configured to:
    calculate a first propagation profile for the entity based at least on the transmission data;
    display the first propagation profile on the display;
    receive the user-input location data;
    calculate a second propagation profile based on the user-input entity location data and the transmission data; and
    display the second propagation profile on the display.

11. The emissions control apparatus according to claim 1, wherein the entity comprises a wheeled or tracked vehicle having one or more electromagnetic transmitters.

12. A vehicle having one or more transmitters and an emissions control apparatus according to claim 1.

13. A method of controlling emissions, the method comprising:
    storing transmission data relating to an entity;
    calculating a propagation profile for the entity based on at least the transmission data;
    displaying the propagation profile;
    calculating an adversary detection profile for an adversary based on adversary data and optionally environment data; and
    displaying the adversary detection profile, the location of the adversary and the propagation profile;
    wherein the adversary data comprises adversary location data and at least one of adversary antenna gain, adversary antenna power, and adversary type.

14. The method according to claim 13, comprising:
    if the propagation profile overlaps the adversary detection profile, suggesting or performing at least one mitigation action to reduce the probability of detection of the entity.

15. The method according to claim 14, comprising:
    calculating a new propagation profile based on adjusted entity characteristics, the transmission data, and the environment data, wherein the new propagation profile does not overlap the adversary detection profile; and
    displaying the values of the adjusted entity characteristics on the display; or generating a control signal to adjust the entity characteristics to match the adjusted entity characteristics.

16. The method according to claim 15, wherein the entity characteristics include at least one of velocity, bearing, location, engine speed, antenna transmission power, antenna transmission frequency and antenna pointing direction.

17. The method according to claim 14, wherein the at least one mitigation action is selected to minimise deviation from a preferred route for the entity.

18. The method according to claim 13, comprising:
    calculating a first propagation profile for the entity based at least on the transmission data and optionally the environment data;
    displaying the first propagation profile on the display;
    receiving user-input location data;
    calculating a second propagation profile based on the user-input entity location data and the transmission data and optionally the environment data; and
    displaying the second propagation profile on the display.

19. The method according to claim 13, wherein the transmission data includes at least one of signal frequency, signal power, antenna gain, antenna power, antenna type and antenna pointing direction.

* * * * *